S. C. LAFLIN.
SPECTACLES.
APPLICATION FILED FEB. 24, 1911.
1,098,911.
Patented June 2, 1914.
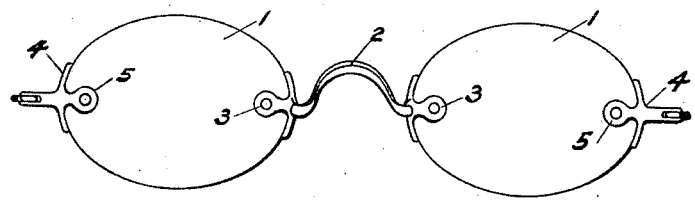
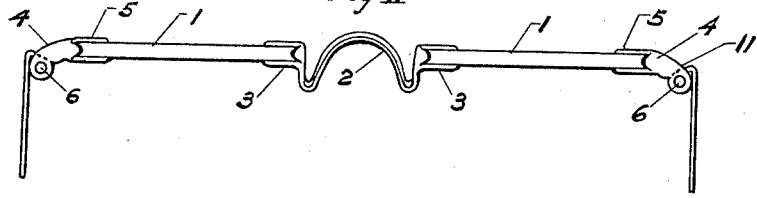
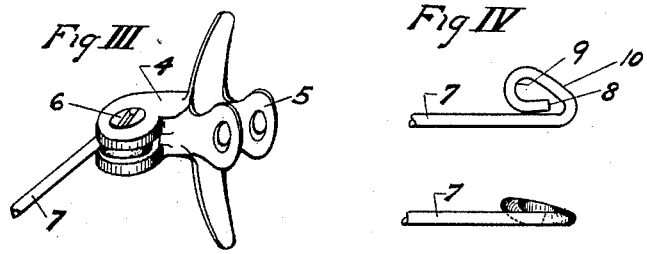
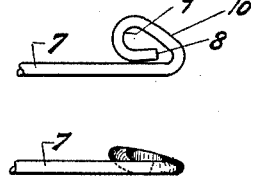
WITNESSES:
R. H. Waters
A. F. Grinnell
INVENTOR
STEPHEN C. LAFLIN
BY
Harry H. Styll
ATTORNEY

UNITED STATES PATENT OFFICE.

STEPHEN C. LAFLIN, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

SPECTACLES.

1,098,911.  Specification of Letters Patent.  Patented June 2, 1914.

Application filed February 24, 1911. Serial No. 610,569.

*To all whom it may concern:*

Be it known that I, STEPHEN C. LAFLIN, a citizen of the United States, residing at Southbridge, in the county of Worcester and State of Massachusetts, have invented certain new and useful Improvements in Spectacles, of which the following is a specification.

My invention relates to improvements in spectacles and has for its object to provide an improved construction of temple end, particularly intended to prevent unintentional closing together of the temples, commonly known as falling temples, and is also intended to provide a simple, economical and efficient construction of temples.

My invention comprises a lens, a temple end piece attachable to the lens, means for pivoting the temple in the end piece, a temple and a coil on the end of the temple of substantially the same size and cross section as the temple, comprising a free end displaceable laterally to yieldingly engage the end piece, a bearing portion adapted to operate on the pivoting means in the end piece, and a shoulder adapted to engage the sides of the end piece and limit the movement of the temples outwardly.

With these and other objects in view, the invention consists in the novel construction and arrangement of parts hereinafter described, delineated in the drawings and specifically claimed, it being understood that changes properly falling within the scope of what is claimed may be made without departing from the spirit of my invention.

Similar numerals of reference are employed to denote corresponding parts throughout the several figures of the drawings.

In the accompanying drawings: Figure I is a rear elevation of a pair of spectacles embodying my invention. Fig. II is a top or plan view of Fig. I. Fig. III is an enlarged perspective view of the end piece and temple end showing the temple end in place on the pivoting means in the end piece. Fig. IV is a view taken in the same plane as Fig. II and shows in detail a section of the temple and the coil on the end thereof. Fig. V is an elevation of Fig. IV, showing the coil laterally displaced.

Referring specifically to the drawings, a pair of lenses 1 are connected in the usual manner by a bridge 2 and lens clips or straps 3, a temple end piece 4 is attached to the outer ends of the lenses 1 by the usual clips 5. This end piece 4 is recessed in the usual manner in the form of a female hinge for the admission of the temple end which is pivoted therein in the usual manner by a pivot screw 6. The end of the temple 7 which is pivoted in the end piece 4 is bent around into a coil having a free end 8 which is resilient and displaceable laterally, as shown in Fig. V. One section of the coil 9, Fig. IV, is formed to produce a bearing surface on the pivot screw 6 and another portion of the loop 10, Fig. IV, is flattened and adjusted to engage the shoulder 11, Fig. II, and limit the outer pivotal movement of the temple.

A recognized defect in spectacles has been the tendency of the temple ends to work loose on their bearings in the end pieces and fall together or drop when the spectacles were being removed or put in place, and various means have hitherto been adopted to prevent this falling, which means have been more or less expensive and in the majority of cases not capable of permanent adjustment. It will be noted, however, from an inspection of Fig. V in the drawing, that the free resilient end of the temple has been displaced laterally. This free end is designed to be yielding so that when placed in the hinged portion of the end piece 4, the coil will yieldingly engage the sides of the female hinge and exert pressure thereon when the pivot screw has been put in place. This pressure, while permitting intentional displacement, will hold the temples in any desired position and prevent them from dropping back of their own accord. It will also be noted that by making the coils of the same shape and cross section as the temples, that the cost of production is considerably reduced and that an economical and efficient construction is produced. It will also be noted that the outward movement of the temples about the pivot 6 may be limited to any desired position by flattening a portion of the coil 10, Fig. IV, and causing it to engage the shoulder of the kerf 11 in the female portion of the end piece 4. This position can be determined as desired and may be 90 degrees or more, according to the mutual relation of the flattened portion 10 and the shoulder 11

Having thus described my invention, the following is what I claim as new therein and desire to secure by Letters Patent:

1. In spectacles the combination of a lens, lens holding means, a temple, means for pivoting the temple in the lens holding means, and a coil on the end of the temple, said coil being of substantially the same cross section as the temple and comprising a free end displaceable laterally and adapted to yieldingly engage the lens holding means, a bearing portion adapted to engage the pivoting means in the lens holding means, and a shoulder adapted to engage the lens holding means and limit the pivotal movement of the temple.

2. The combination with an end piece included a pair of spaced ears, of a temple having a pivot receiving loop formed therein, the material forming the loop being continued in a straight portion and then reversely bent and continued rearwardly past the loop, the loop being slightly twisted from its normal plane, whereby when the loop is placed between the ears of the end piece the twisting will cause the same to frictionally engage the ears to resist pivotal movement of the temple while the forward continuation adjacent the loop will provide a shoulder to engage the end piece and limit the pivotal movement of the temple in one direction.

3. The combination with an end piece including a pair of spaced ears, of a temple having a pivot receiving loop formed therein of the same cross-section as the temple, the material forming the loop being continued in a straight portion, and then reversely bent and continued rearwardly past the loop, the loop being twisted slightly from the normal plane.

In testimony whereof I affix my signature in presence of two witnesses.

STEPHEN C. LAFLIN.

Witnesses:
 ROBT. S. CALLENDER,
 ALBERT C. CLARKE.

---

Copies of this patent may be obtained for five cents each, by addressing the "Commissioner of Patents, Washington, D. C."